(12) United States Patent
Ohkawa et al.

(10) Patent No.: US 6,568,820 B1
(45) Date of Patent: *May 27, 2003

(54) GUIDE PLATE, SURFACE LIGHT SOURCE DEVICE OF SIDE LIGHT TYPE AND LIQUID CRYSTAL DISPLAY

(75) Inventors: Shingo Ohkawa, Koshigaya (JP); Hiroshi Yamazaki, Higashimatsuyama (JP); Junichi Ohkuma, Koshigaya (JP)

(73) Assignees: Enplas Corporation, Kawaguchi (JP); Yasuhiro Koike, Yokohama (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/469,352

(22) Filed: Dec. 22, 1999

(30) Foreign Application Priority Data

Dec. 28, 1998 (JP) .............................. 10-372109

(51) Int. Cl.⁷ ................................. F21V 7/04
(52) U.S. Cl. ..................... 362/31; 362/330; 362/332; 362/339
(58) Field of Search .................... 362/31, 330, 331, 362/332, 339

(56) References Cited

U.S. PATENT DOCUMENTS 5,944,405 A * 8/1999 Takeuchi et al. .............. 362/31
5,997,148 A * 12/1999 Ohkawa ........................ 362/31
6,074,069 A * 6/2000 Chao-Ching et al. ......... 362/26
6,104,854 A * 8/2000 Masaki et al. ............... 385/133

FOREIGN PATENT DOCUMENTS

CN 85-270978 2/1996
CN 86101120 1/1997

* cited by examiner

Primary Examiner—Stephen Husar
Assistant Examiner—Ronald E. DelGizzi
(74) Attorney, Agent, or Firm—Staas & Halsey LLP (57) ABSTRACT

A guide plate has a major face on which projections are arranged, wherein the projections have an arch-like profile within the vicinity of an incidence end face, or, in addition to this, within regions along both side end faces, thereby preventing the guide plate from producing abnormal brightness which could be caused by reflective appearance of edges. A primary light source is disposed beside the guide plate. Major faces of the guide plate provide an emission face and a back face. A prism sheet and a protection sheet are disposed along the emission face. A liquid crystal display panel is additionally arranged to provide a liquid crystal display. The guide plate has a wedge-shaped cross section and a minor face at its thicker end provides the incidence end face along the primary light source. The emission face may be provided with light scattering pattern to promote emission. The projections may have a profile variation such as changing gradually from being arc-like to being triangular via transitive according to distance from the incidence end face and from side edges.

19 Claims, 9 Drawing Sheets

FIG.2A

1: SURFACE LIGHT SOURCE DEVIDE OF SIDE LIGHT TYPE

GUIDE PLATE, SURFACE LIGHT SOURCE DEVICE OF SIDE LIGHT TYPE AND LIQUID CRYSTAL DISPLAY

BACKGROUND

1. Field of Invention

The present invention relates to a guide plate, surface light source device of side light type and liquid crystal display, in particular, to a guide plate having improved emission characteristics, surface light source device of side light type employing the improved guide plate and liquid crystal display employing the surface light source device for illuminating a liquid crystal display panel.

2. Related Arts

Surface light source devices of side light type broadly employ as guiding-and-emitting means a guide plate (plate-like light guide) of a type such that light is introduced from a side end face provided by a minor face and is emitted from an emission face provided by a major face, because a thin-structured arrangement is realized easily by disposing a primary light source beside the guide.

And surface light source devices of side light type employing such a guide plate are applied to, for example, liquid crystal displays for lighting of liquid crystal display panel.

In the present specification, a side end face for introducing light is called "incidence end face" and another major face, which is opposite with the emission face, is called "back face".

On lightening of a primary light source incorporated in a surface light source device of side light type, illumination light is introduced into a guide plate through an incidence end face. Thus introduced illumination light propagates in the guide plate, with light being emitted meanwhile little by little from an emission face of the guide plate, for example, toward a liquid crystal display panel.

Guide plates are classified into two types depending on cross section shape, one having an approximately uniform thickness, the other having thickness tending to reduce according to distance from a side end face. In general, the latter gives a higher emission efficiency as compared with the former.

In almost every case, surface light source devices of side light type are desired to output illumination light directed a frontal direction for the main. Known are two methods of modifying emission directivity to promote frontal outputting. According to one of the methods, a prism sheet is disposed along the emission face. And according to the other, a great number of projection rows are formed on a back face or emission face of the guide plate.

Usually, the former is applied for modifying directivity regarding in a plane perpendicular to the incidence end face. It is noted that a "both-prism-face prism sheet" formed with prism rows running vertically to each other on both faces further enables directivity to be modified regarding in a plane parallel to the incidence end face.

On the other hand, the latter is applied for modifying directivity regarding in a plane parallel to the incidence end face. In this case, the projection rows are formed as to extend in an approximately vertical direction with respect to the incidence end face. Individual projection row includes a pair of slopes to form a triangle-like profile.

However, if the latter is applied to a conventional surface light source device of side light type, the device is subject to problem that abnormal emission (reflective appearance) tends to be brought in a part of guide plate. This abnormal emission appears on an emission face like some bright lines near to and along an incidence end face. So-called "reflective appearance of edges" is regarded as being causative of such abnormal emission.

In other words, upper and lower edges of an incidence end face of a guide plate are apt to be strongly irradiated by illumination light, often leading to a phenomenon such that the edge irradiation produces beams emerging as bright lines which can be observed from the outside of the emission face. Since illumination light that travels by way of an edge propagates within the guide plate so as to go and come back between the emission and back faces and some emission occurs at every chance of incidence to the emission face, not a single bright lines are observed.

It is noted that reflective appearance similar to the above can be caused by illumination light that travels by way of a lateral side edge of the guide plate. Such reflective appearance caused in connection with a lateral side edge tends to emerge as bright lines along lateral margins of the guide plate.

Abnormal emission caused by the above-described reflective appearance tends to be more striking if projection rows with triangle-like cross section are formed on a major face (emission face or back face) of the guide plate, as compared with a case where they are not formed (i.e. flat face). It may be surmised that this difference is due to that the projection rows cause illumination light travelling by way of an edge to be converged and emitted toward a frontal direction.

Needless to say, abnormal emission caused by reflective appearance reduces illumination quality of a surface light source device of side light type. Besides, if the device is applied to lighting of a liquid crystal display panel of a liquid crystal display, the display is subject to reduction in display quality.

OBJECT AND SUMMARY OF INVENTION

The present invention is proposed under the above-described background and an object of the invention is to provide a guide plate which is improved so that abnormal emission caused by reflective appearance of edges is reduced. Another object of the invention is to provide a surface light source device of side light type having an improved illumination quality by the use of the improved guide plate, and still another object of the invention is to provide a liquid crystal display having an improved display quality by the use of the improved surface light source device of side light type for backlighting of a liquid crystal display panel.

The present invention can be applied to a guide plate which comprises a minor face to provide an incidence end face for introducing light and major faces to provide an emission face for emitting light which has been introduced through said incidence end face and to provide a back face which is opposite with said emission face.

One of the emission face and back face of the guide plate improved according to the present invention is provided with a great number of projections extending in a direction approximately vertical to said incidence end face. These projections include arc-like-profiled projections located within a first predetermined range near to said incidence end face. This causes light propagating by way of an edge to be emitted from the emission face after being subject to direction expansion involved by inner reflection at a projection. As a result, abnormal emission like bright lines hardly to appears on the emission face. In other words, abnormal emission caused by reflective appearance is reduced.

The projections are preferably configured so that projection profile transits gradually from an arc-like-shape to a triangle-like shape according to distance from the incidence end face in order to avoid affection of sharp profile changing.

It is also preferable that the projections further include arc-like-profiled projections located within a second predetermined range along a flank face of said guide plate. This prevents abnormal emission which could emerge around the lateral side edges. A typically employed guide plate is made of a scattering-and-guiding material provided with uniform scattering power inside. A transparent guide plate may be employed.

The present invention can be applied to a surface light source device of side light type including a primary light source an a guide plate which comprises a minor face to provide an incidence end face for introducing light supplied by the primary light source and major faces to provide an emission face for emitting light which has been introduced through said incidence end face and to provide a back face which is opposite with said emission face.

According to the present invention, the guide plate is the above-mentioned improved guide plate. This gives an improved quality to the output illumination light.

The present invention is further applied to a liquid crystal display including a liquid crystal display panel and a surface light source device of side light type for illuminating the panel.

The surface light source device of side light type includes a primary light source an a guide plate which comprises a minor face to provide an incidence end face for introducing light supplied by the primary light source and major faces to provide an emission face for emitting light which has been introduced through said incidence end face and to provide a back face which is opposite with said emission face. The guide plate is the above-mentioned improved guide plate. This brings an improved display quality.

The above-described features and other features of the present invention will be understood in more details by the following description and the accompanied drawings to be referred.

EMBODIMENT (1) First Embodiment

Figures 2A, 2B, 2C:
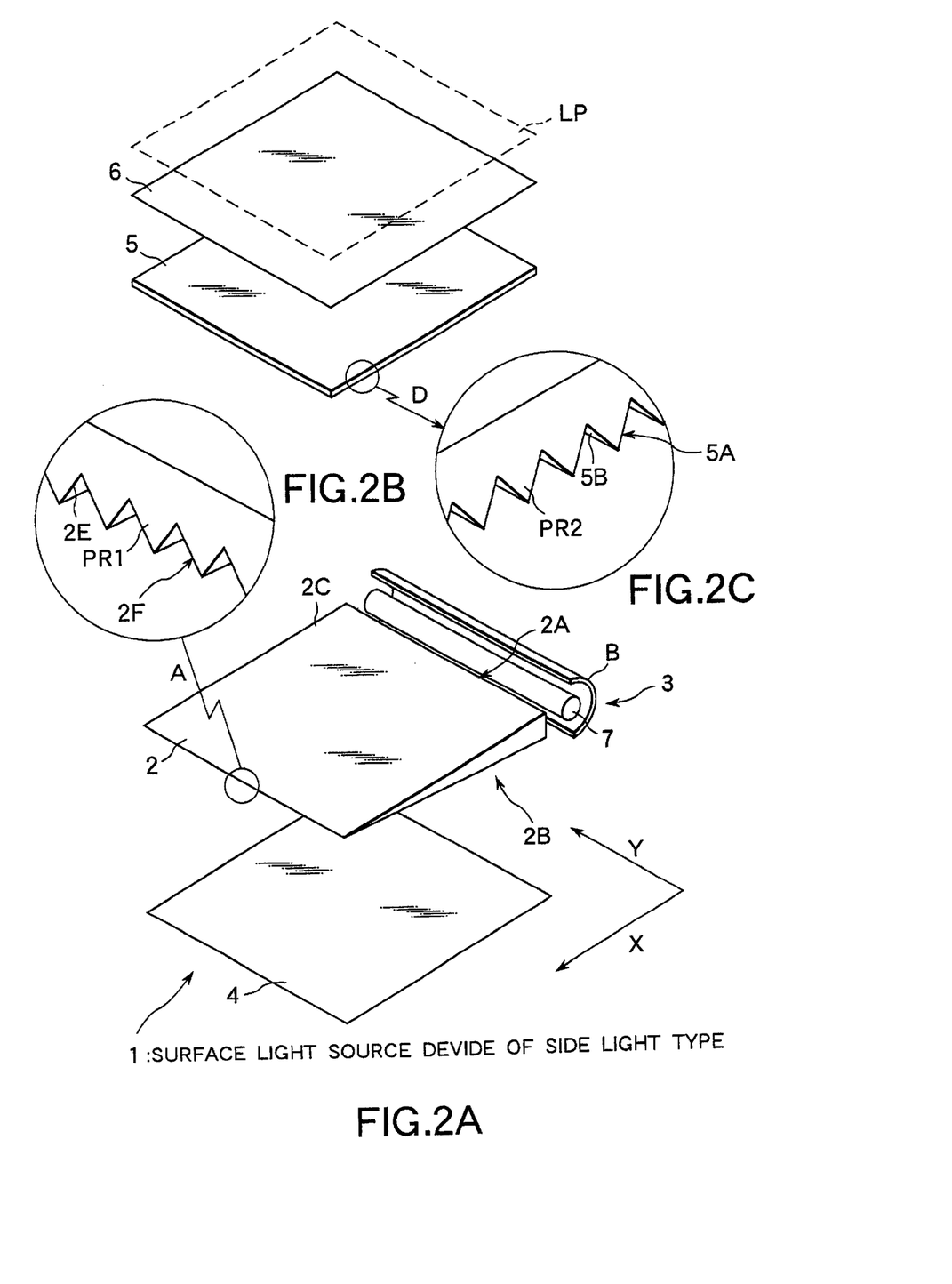
FIG. 2 is an exploded perspective view to illustrate the first embodiment in accordance with the present invention.

Referring to FIG. 2, a surface light source device of side light type 1 comprises a primary light source 3, reflection sheet 4, guide plate 2, prism ]sheet 5 and a protection sheet 6. If the surface light source device 1 is applied to a liquid crystal display, a liquid crystal display panel LP is disposed at the outside of the protection sheet 6.

Figures 1A, 1B, 1C:
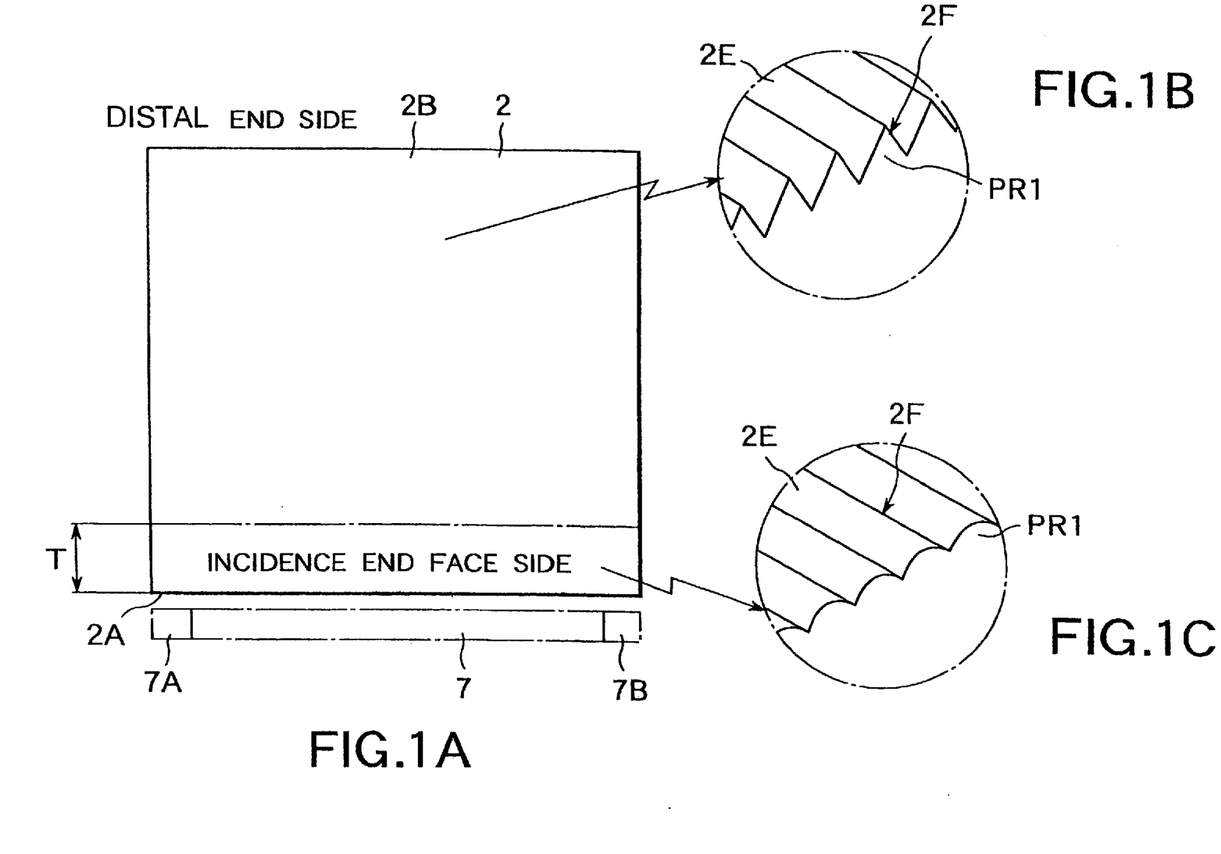
FIG. 1 is a plan view of a guide plate employed in a first embodiment in accordance with the present invention.

The primary light source 3 is composed of a fluorescent lamp 7 and reflector 8, supplying illumination light toward an incidence end face 2A of the guide plate 2. Referring to FIG. 1, the fluorescent lamp 7 has electrode portions 7A, 7B at both ends, the electrode portions 7A, 7B being supplied with electric power from a power source which is not shown.

The guide plate 2 has two major faces to provide an emission face 2C and back face 2B, with the prism sheet 5 and protection sheet 6 being disposed along the emission face 2C. The reflection sheet 4, guide plate 2, prism ]sheet 5 and the protection sheet 6 are laminatedly arranged and held, together with the fluorescent lamp 7 and reflector 8, by a frame member which not shown.

The guide plate 2 has a wedge-like cross section and a thicker end minor face provides an incidence end face 2A extending along the fluorescent lamp 7. Two major faces provide the emission face 2C an the back face which is opposite with the emission face 2C.

The guide plate 2 employed in the present embodiment is made of scattering-and-guiding material provided with uniform scattering power inside. The scattering-and-guiding material is composed of, for example, a matrix of PMMA (polymethylmethacrylate) and a great number of light permeable fine particles uniformly dispersed within the matrix. The fine particles have refractive index which is different from that of the matrix.

Further to this, the emission face 2C may be formed with light scattering pattern. The light scattering pattern consists of a great number of micro-rough-regions distributed according to a predetermined rule, wherein the micro-rough-regions may be formed by a method such as mat-processing, or application of etching to an inner face of a mold which is used for molding of the guide plate 2.

The rule of arrangement is preferably determined so that a high score of distribution density is marked in the vicinity of the electrode portions 7a and 7B. It is further preferable that distribution density is controlled depending on distance from the incidence end face 2A to flatten brightness over the emission face. In addition, it is preferable that the micro-rough-region arrangement does not have a high regularity to avoid moire fringes which could emerge in association with a periodic micro-structure of the liquid crystal display panel LP.

Each micro-rough-region has a shape such as circular-dot, wherein the circular-dot has preferably a diameter small enough to be invisible, not greater than 50 $\mu$m, for example, about 50 $\mu$m. A particularly preferable range is 25 $\mu$m or less.

The reflection sheet 4 is a sheet member with irregular reflectivity such as white PET film, returning illumination light that has leaked out of the back face 2B of the guide plate 2 into the guide plate 2 to prevent loss of illumination light. The reflection sheet 4 may be alternatively a sheet member with regular reflectivity such as silver foil.

Illumination light introduced into the guide plate 2 through the incidence end face 2A propagates with repeating reflections at the back face 2B and emission face 2C as well as with scattering caused by the fine particles. On the way of this process, illumination light escapes through the emission face 2C at an approximately constant rate. As well known, the emission face 2C emits illumination light with directivity such that the emitted illumination light has a preferential propagation direction inclined toward the incidence end face 2A (oppositely to a distal end) with respect to a frontal direction.

The prism sheet 5 is orientated so that a prism face is directed to the guide plate 3. The prism face of the prism sheet 5 consists of a great number of projections PR2 provided with a pair of slopes 5A and 5B as shown in a partial enlarged illustration D. The slopes 5A, 5B are flat, giving a triangular profile to each of the projections PR2. The projections run approximately in parallel with the incidence end face 2A.

Repetition pitch of the projections PR2 is about 50 μm. Vertical angle of projection (prismatic vertical angle) is designed so as to fall within a range such as from 30 to 70 degrees. In some cases, a so-called asymmetric prism sheet may be employed, wherein slopes 5A and 5B are different from each other in inclination.

It is well known that such prism sheet 5 provided with the projections PR2 (i.e. prism face) corrects the preferential propagation direction of emission toward a frontal direction of the emission face 2C regarding in a plane perpendicular to the incidence end face 2A. Illumination light outputted from the prism sheet 5 becomes output illumination light after passing through the protection sheet 6, being directed to, for example, the liquid crystal display panel LP. It is noted that the protection sheet 6 is made of, for instance, a sheet material having a weak scattering power and prevents the prism sheet 5 from sticking to the liquid crystal display panel LP. Beside this, it is expected that reflective appearance of edges becomes less conspicuous.

The back face 2B of the guide plate 2 provides a prism face including a great number of projections PR1 in order to correct directional distribution of emission so as to gather light around a frontal direction of the emission face 2C regarding in a plane parallel to the incidence end face 2A. Each projection PR1 has a pair of slopes and runs approximately in a direction perpendicular to the incidence end face 2A.

A triangular profile of projection PR1 formed with a pair of slopes 2E and 2F connected to each other as shown in FIGS. 1 and 2 (please see a partial enlarged illustration A). In the present embodiment, slopes 2E and 2F make an angle (prismatic vertical angle) about 100 degrees. In general, prismatic vertical angle is preferably designed and determined so as to fall within a range from 70 to 130 degrees. Repetition pitch of the projections PR1 is about 50 μm. Under such repetition pitch, the projections PR1 are hardly visible and bring no reduction in illumination quality.

It should be noted that each projection PR1 has profile featured according to the present invention. That is, as illustrated in FIG. 1, each projection PR1 has an arc-like-profile within a band-like area of width T (first predetermined range) in the vicinity of the incidence end face 2A while the other projections in the remaining area are triangle-like-profiled. In other words, each pair of slopes 2E, 2F are connected to each other smoothly so as to form an arc-like profile.

In the present embodiment, area width T is about 10 times as large as thickness at the thickest portion of the guide plate 2. In general, area width T is determined according to a design.

Figure 11A:
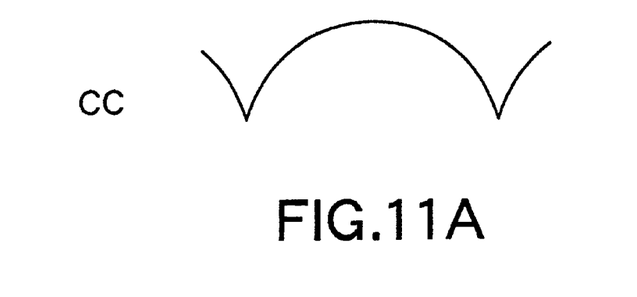
Figure 11B:
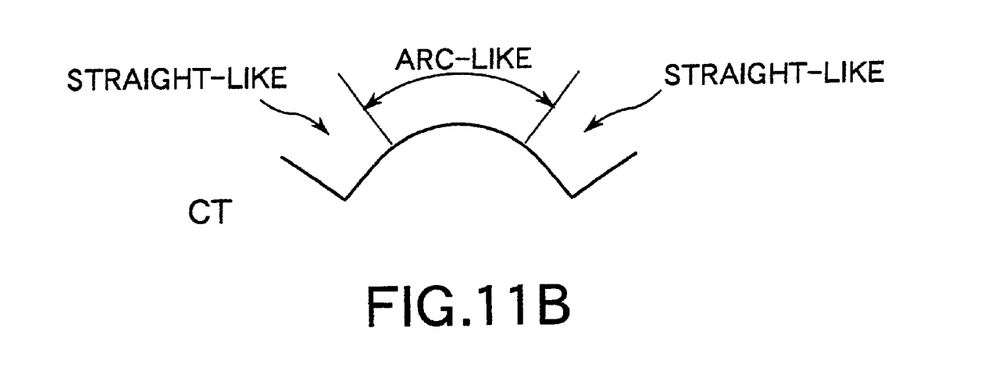
Figure 11C:
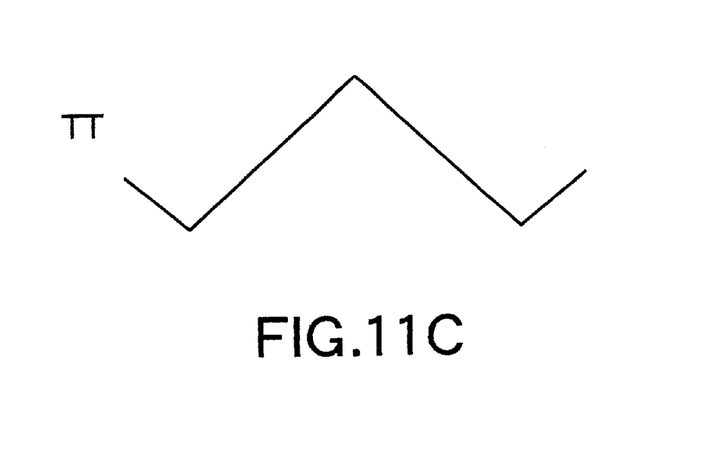

Profiles of the projections PR1 are designed preferably so as to transit from arc-like profile CC to triangle-like TT profile via an intermediate profile CT gradually according to distance from the incidence end face 2A, as illustrated in FIG. 11.

Transition of profile may occur within the area T and also may stars at a boundary between the area T and the other area. Alternatively, transition may occur within around the boundary. Such manners of gradual profile transition prevents the emission face 2C from being locally disturbed.

Figure 3:
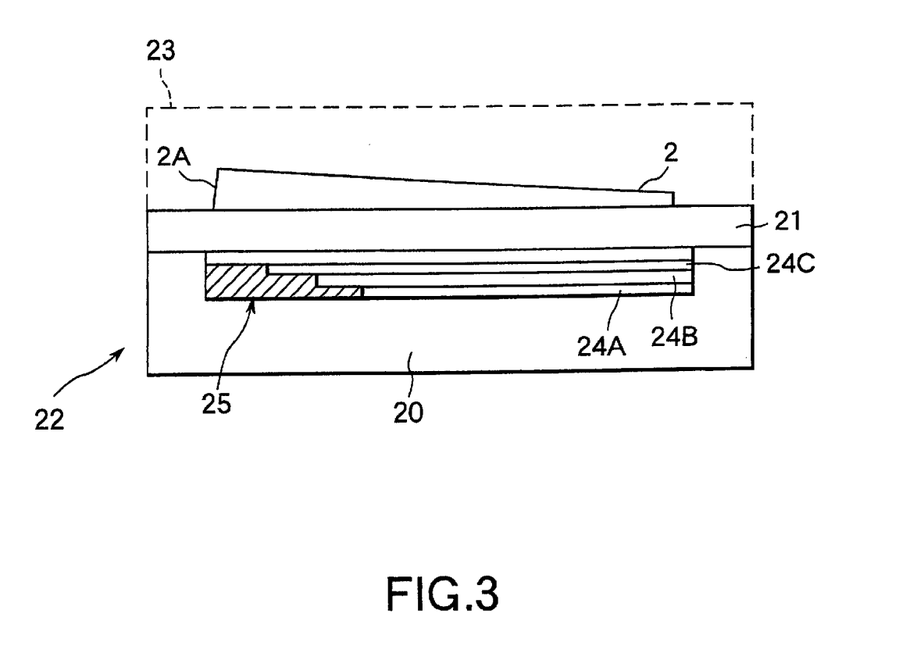
FIG. 3 is a diagram to illustrate a method of manufacturing of the guide plate shown in FIG. 1.

FIG. 3 is referred to exemplarily describe a method of manufacturing of the guide plate 2 provided with gradually varying profiles. FIG. 3 is a cross sectional view illustrating state of the guide plate 2 in the process of injection molding. A mold comprises an upper mold 22 and lower mold 23 (dotted line). The upper mold 22 is prepared by arranging a piece 21 on a base 20 of the mold. And molten resin is injected into a cavity formed between the upper mold 22 and lower mold 23 to produce the guide plate 2.

The piece 21 has an inner face provided with triangle-like fine configurations to form projections PR1. On the other hand, the lower mold 23 has an inner face provided with micro-configurations distributed according to a designed light scattering pattern.

Profile transition of projections PR1 is realized by controlling transfer characteristics of the upper mold through temperature regulation. For this temperature regulation, a plate member 25 having a good thermal conductivity and thermal-insulating sheet members 24A, 24B, 24C are interposed between the base 20 and piece 21. As illustrated, a block having a stepwise profile is arranged so that the thickest end portion corresponds to the incidence end face 2A.

On the other hand, the thermal-insulating sheet members 24A, 24B, 24C are laminatedly arranged so as to function as a spacer to occupy a space which is not occupied by the plate member 25. After resin is injected, heat dissipates rapidly through the plate member 25 having a good thermal conductivity in the vicinity of the incidence end face 2A. On the contrary, portions distant from the plate member 25 are subject to gentle heat dissipation.

As a result, molten resin cools rapidly in the vicinity of the incidence end face 2A, reducing transfer ability of an inner surface of the piece 21. On the contrary, portions distant from the plate member 25 are subject to gentle resin cooling, maintaining high transfer ability. After all, since triangle-like fine configurations are formed on the inner surface of the piece 21, projections having arc-like profile with a round top portion (See CC in FIG. 11) are produced in the vicinity of the incidence end face 2A while projections having triangle-like profile with a sharp top portion (See TT in FIG. 11) are produced in regions sufficiently far from the incidence end face 2A.

And a gentle gradient in rate of cooling-and-solidification of the molten resin is provided in a region ranging from a tail of the thickest portion of the plate member 25 to around a tail of the thinnest portion of the plate member 25, leading to a gentle gradient in transfer ability. Thus produced projections are provided with profile transition varying from arc-like configuration to triangle-like configuration in the above region.

The plate member 25 having a good thermal conductivity may be made of a metal such as phosphor bronze. And the thermal- insulating sheet members 24A, 24B, 24C may be thermal-insulating films such as polyimide resin films.

Figure 4:
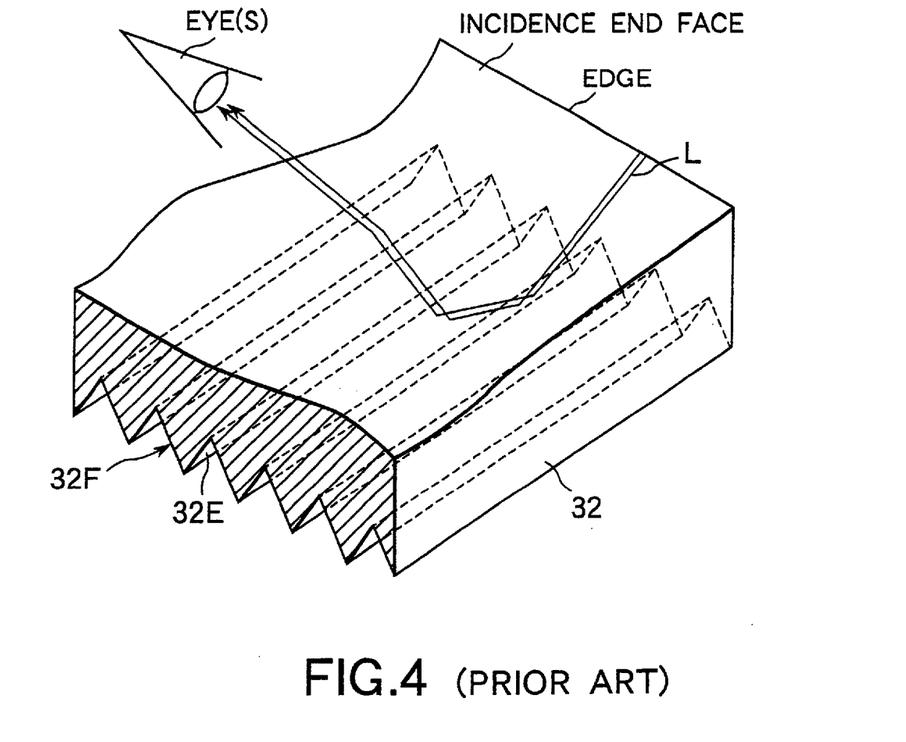
FIG. 4 is a perspective view to illustrate reflective appearance which occurs in a prior art.
Figure 5:
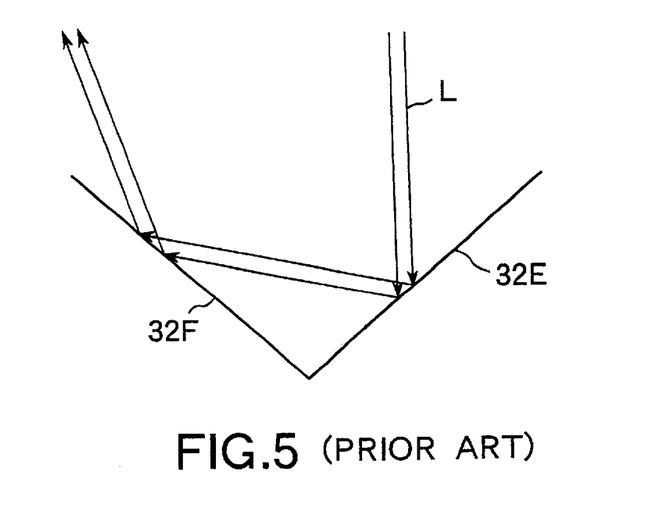
FIG. 5 illustrates light paths in connection with FIG. 4.

Mechanism of abnormal emission is described with referring to FIGS. 4 and 5 in order to give understanding how the arc-profiled projections of the present invention prevent abnormal emission.

FIG. 4 gives a perspective view of a part of a conventional guide plate 32 which has a back face provided with triangle-like projections composed of flat slopes 32E, 32F. Two beams L represent illuminating beams entering into the guide plate 32 via an edge at which an incidence end face meets an emission face.

Since this edge is just near to a primary light source (not shown), illumination light beam L has a remarkably great intensity around the incidence end face.

The illumination beams L directed to a back face of the guide plate 32 from the edge impinge respectively onto one of the slopes 32E, 32F, being followed by reflection (almost total reflection). As FIG. 5 shows a partially enlarged view around the slopes 32E, 32F, illumination light L once incident to one slope 32E is reflected again at the other slope 32F (almost total reflection), being directed to the emission face. In a similar way, illumination light L once incident to the slope 32F is reflected again at the other slope 32E (almost total reflection), being directed to the emission face.

Note that paths of the beam pair are hardly diverged on the way from the edge to the emission face via reflections at 32E and 32F (or 32F and 32E) because the slope 32E, 32F are flat In other words, illumination beams L propagating via the edge tend to be emitted in almost the same direction, seeming to result in emerging of abnormal emission like bright lines (FIG. 4).

The present inventor has paid attention to this and proposed the present invention which reduce abnormal emission through suppress the above tendency that illumination beams L propagating via the edge tend to be emitted in almost the same direction. To under stand this, FIGS. 6 and 7 are referred.

Figure 6:
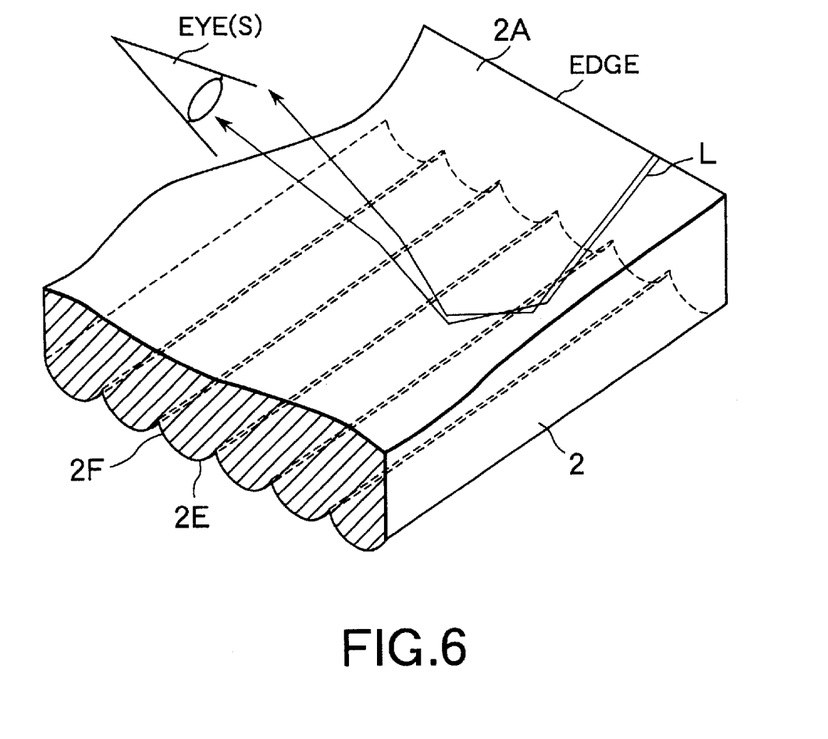
FIG. 6 is a perspective view to illustrate light paths in the guide plate shown in FIG. 1.
Figure 7:
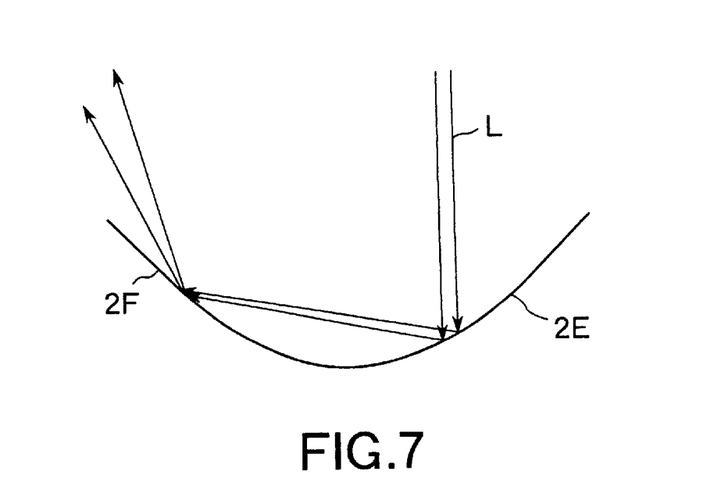
FIG. 7 illustrate the light paths shown in FIG. 6 as viewing in a plane parallel to an incidence end face.

FIG. 6 is a perspective view around the incidence end face 2A of the guide plate 2 employed in the first embodiment, wherein the guide plate 2 has a back face provided with arc-like profiled projections each of which is composed of smoothly curved slopes 2E, 2F.

Two beams L represent illuminating beams entering into the guide plate 2 via an edge at which the incidence end face 2A meets the emission face 2C in the same manner as in FIGS. 4 and 5.

Since this edge is just near to a primary light source (not shown), illumination light beam L has a remarkably great intensity around the incidence end face 2A.

The illumination beams L directed to a back face of the guide plate 2 from the edge impinge respectively onto one of the curved slopes 2E, 2F, being followed by reflection (almost total reflection).

As FIG. 7 shows a partially enlarged view around the slopes 2E, 2F, illumination light L once incident to one slope 2E is reflected again at the other slope 2F (almost total reflection), being directed to the emission face. In a similar way, illumination light L once incident to the slope 2F is reflected again at the other slope 2E (almost total reflection), being directed to the emission face.

It should be noted that path directions of the beam pair are remarkably diverged on the way from the edge to the emission face via reflections twice because the slope 2E, 2F are curved. In other words, illumination beams L propagating via the edge has a strikingly less tendency of emission in almost the same direction. Accordingly, abnormal emission like bright lines hardly emerges.

Such abnormal emission suppressing means (arc-like profiled projection) is required most positively in the vicinity of the incidence end face 2A, while the means is gradually and decreasingly required according to distance from the incidence end face.

In the first embodiment, this is considered and arc-like profiled projections are formed within a range of a certain width T from the incidence end face 2A, with a gradual profile transition to triangle-like profile starting at leaving of the range.

Further noted arc-like profiled projections give emission various directions. Therefore, in theory, emission directivity from the emission face is possibly reduced in the vicinity of the incidence end face 2A. To see how much directivity is reduced, angular emission characteristics is measured for the guide plate 2 employed in the present embodiment. Results are graphed in FIGS. 8 and 9.

Figure 8:
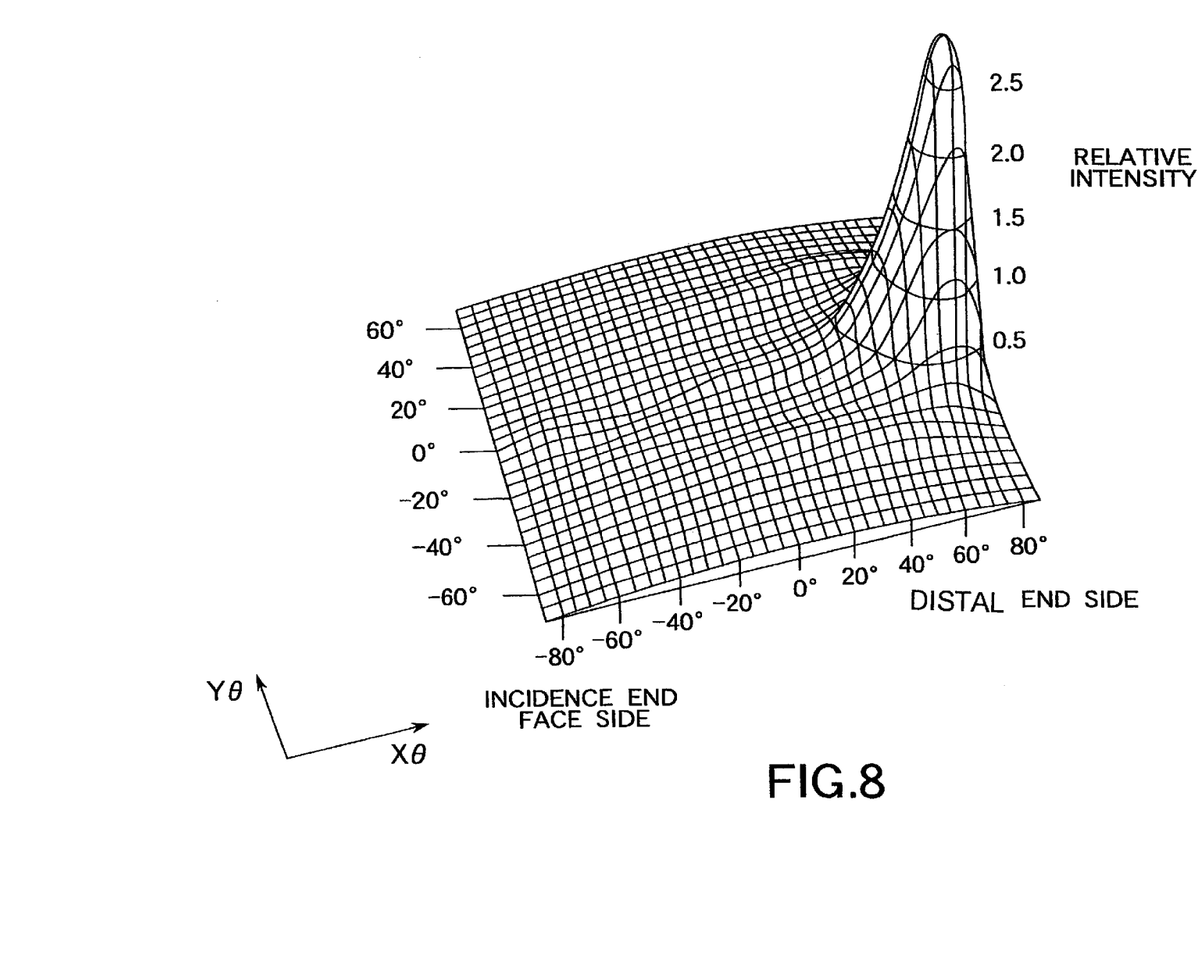
FIG. 8 is a graph illustrating angular emission characteristics in the vicinity of an incidence end face of the guide plate of the first embodiment.
Figure 9:
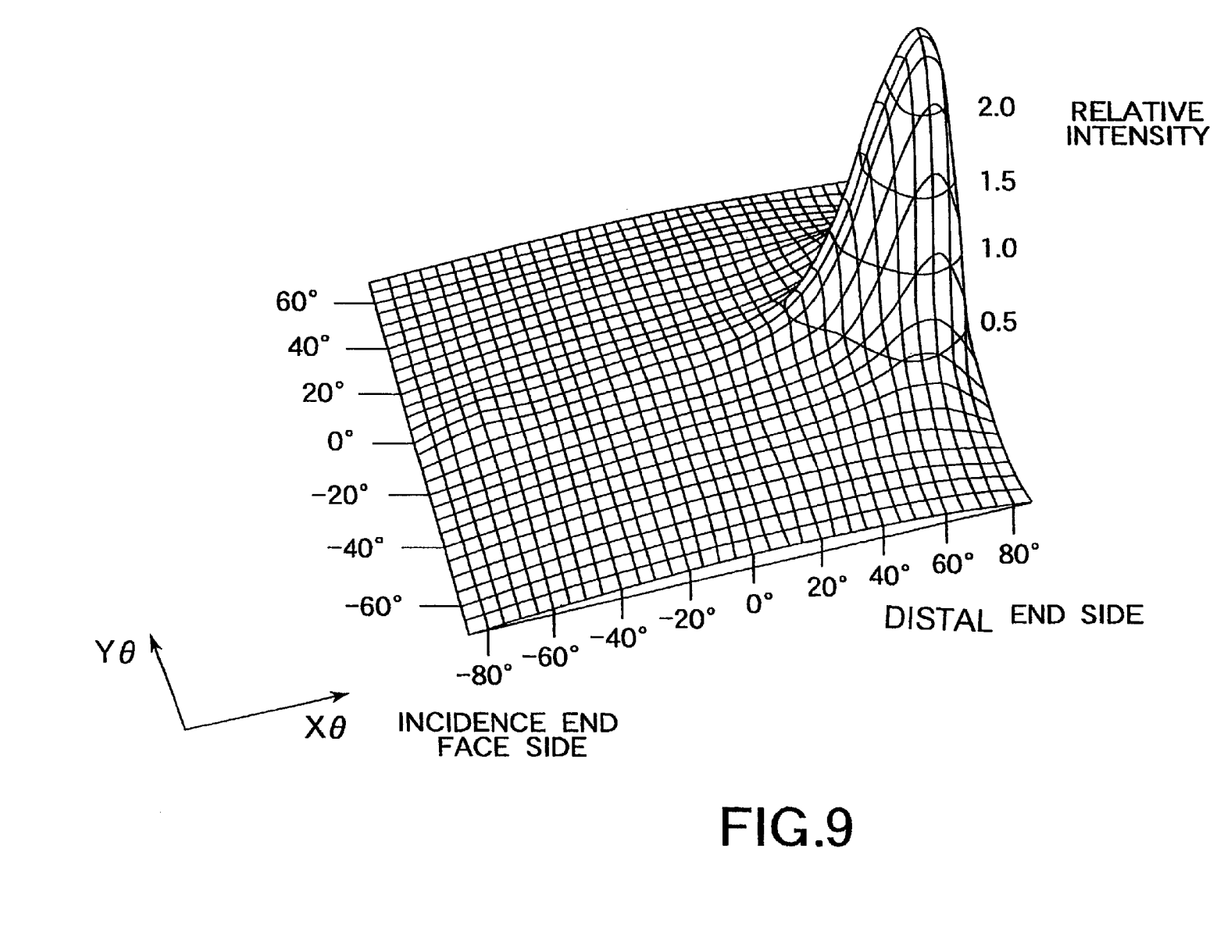
FIG. 9 is a graph illustrating angular emission characteristics in the vicinity of a distal end of the guide plate of the first embodiment.

FIG. 8 is a graph illustrating angular emission characteristics in the vicinity of an incidence end face 2A of the guide plate 2 while FIG. 9 is a graph illustrating angular emission characteristics in the vicinity of a distal end (i.e. wedge top) of the guide plate 2.

In both graphs, abscissa $X\theta$ indicates angle (unit:degrees) in a plane perpendicular to the incidence end face 2A while $Y\theta$ indicates angle (unit:degrees) in a plane parallel to the incidence end face 2A. Regarding signs ±, +X corresponds to forward directions as viewed from the incidence end face 2A while −X corresponds to rear directions, and +Y corresponds to right-hand directions as viewed from the incidence end face 2A while −Y corresponds to left-hand directions. Emission intensity is indicated on a height direction perpendicular to a plane $X\theta-Y\theta$.

As understood by comparing FIG. 8 with FIG. 9, regarding both of $X\theta$ and $Y\theta$ components, striking reduction in directivity around the incidence end face 2A is not observed. And the graphs have no unnatural distortion. These results tell that the present embodiment is subject to directivity reduction which is small enough to be allow practical use.

(2) Second Embodiment

Abnormal emission caused by reflective appearance of edges can generate in association with edges of both flank faces. In order to avoid this, the present embodiment employs arc-like-profiled projections formed on a back face within areas along both flank faces, in addition to in the vicinity of an incidence end face.

Figure 10A:
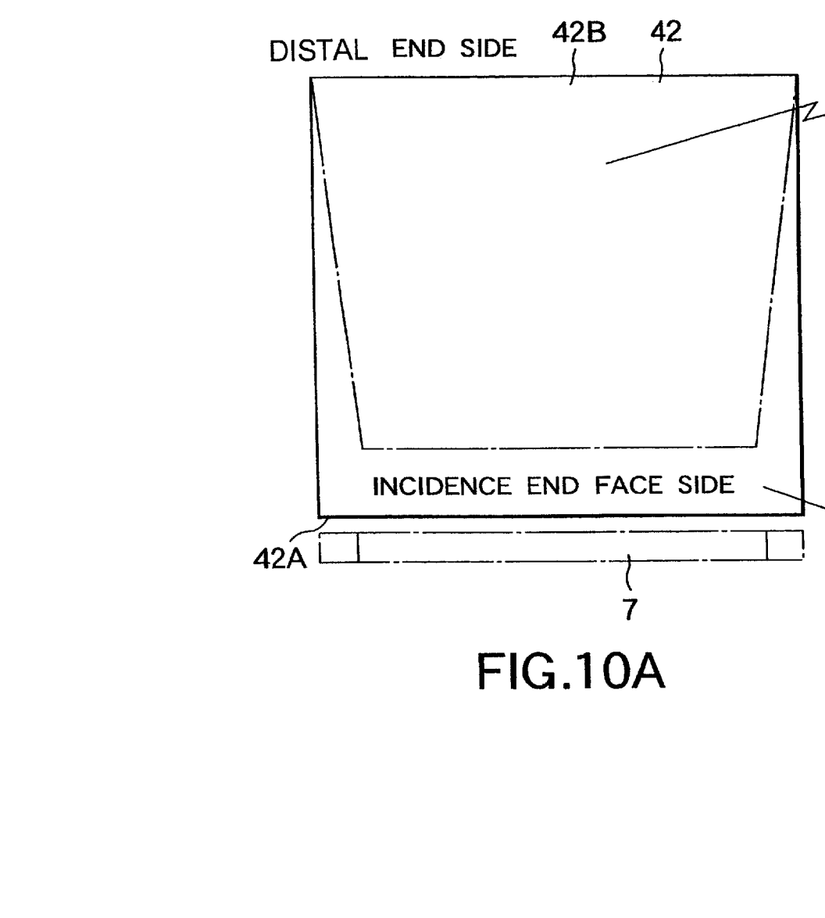
FIG. 10 is a plan view of a guide plate employed in a second embodiment in accordance with the present invention; and, FIG. 11 illustrates profile variation of projections.
Figures 10B, 10C:
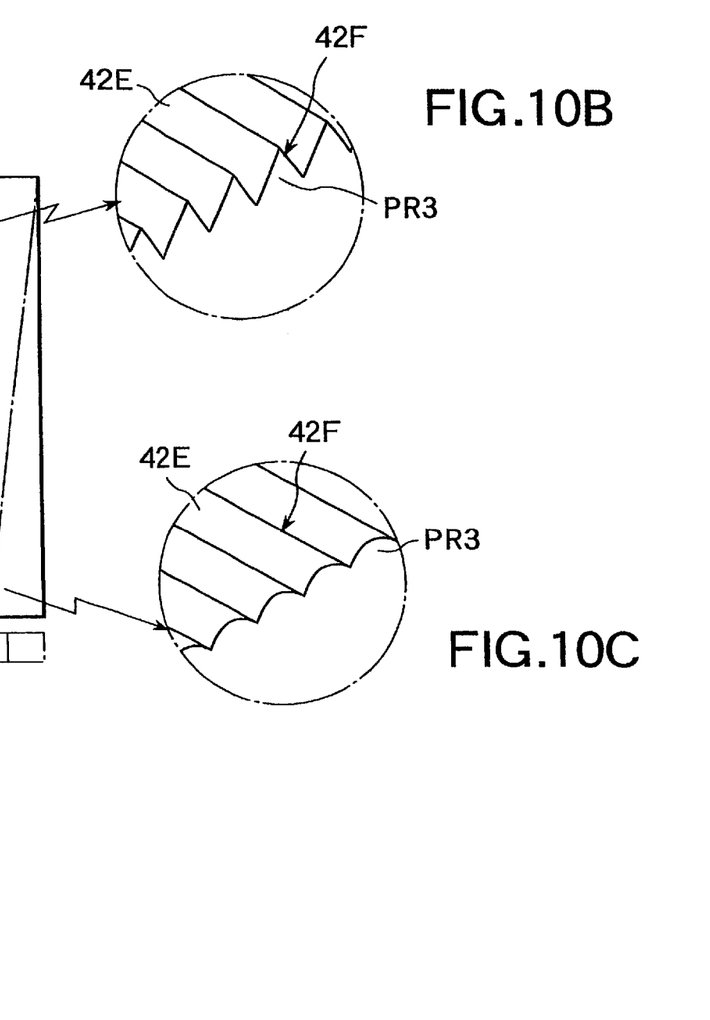

The present embodiment is structured and arranged in the same way as that of the first embodiment except that a guide plate having a back face as shown in FIG. 10 is employed instead of the guide plate 2 having a back face as shown in FIG. 1. Accordingly, description is focused on this difference in guide plates. Matters (structure, arrangement and operation) common to the first embodiment are skipped Referring to FIG. 10, the guide plate 42 is disposed beside a rod-like fluorescent lamp 7. The guide plate 42 has major faces to provide a back face 42B and an emission face (not shown) along which a prism sheet and protection sheet are disposed. If this arrangement is applied to a liquid crystal display, a liquid crystal display panel is disposed in addition. In other words, if the guide plate 2 in FIG. 2 is substituted by the guide plate 42, arrangement of a surface light source device of side light type or a liquid crystal display in accordance with the second embodiment is obtained.

The guide plate 42 has a wedge-like cross section and a thicker end minor face provides an incidence end face 42A extending along the fluorescent lamp 7. The guide plate 42 employed in the present embodiment is made of scattering-and-guiding material provided with uniform scattering power inside in the same manner as that of the guide plate 2.

The emission face may be provided with light scattering pattern to promote emission also in the same manner as that of the guide plate 2.

The back face 42B of the guide plate 42 provides a prism face including a great number of projections PR3 in order to correct directional distribution of emission so as to gather light around a frontal direction of the emission face regarding in a plane parallel to the incidence end face 42A. Each projection PR1 has a pair of slopes and runs approximately in a direction perpendicular to the incidence end face 42A.

The projections PR3 have an arc-like profile within a triangle-like areas along both lateral edges, in addition to within a band-like area along the incidence end face 42A, as shown in two pieces of partially enlarged illustration in FIG. 10. The band-like are along the incidence end face 42A is about 10 times as large as thickness at the thickest portion of the guide plate 42 in the same manner as that of the first embodiment.

The triangle-lie areas along both lateral edges are, at the widest portion, about 5 times as large as the thickness at the thickest portion of the guide plate 42, nevertheless permitting sizes according to design in general. The reason why the areas along both lateral edges are tapered is that reflective appearance of flank face edges tend to occur decreasingly according to distance from the incidence end face 42A. This tendency is supposed to be due to that quantity of light incident to the lateral edges decreases according to distance from the incidence end face 42A.

Within the other area, the projections PR3 have a triangle-like profile composed of a pair of flat slopes 42E, 42F.

Slopes 2E and 2F make an angle (prismatic vertical angle) about 100 degrees. In general, prismatic vertical angle is preferably designed and determined so as to all within a range from 50 to 130 degrees. Repetition pitch of the projections PR3 is about 50 μm. Under such repetition pitch, the projections PR3 are hardly visible and bring no reduction in illumination quality.

Also in the present embodiment, profiles of the projections PR3 are designed preferably so as to transit from arc-like profile CC to triangle-like TT profile via an intermediate profile CT gradually according to distance from the incidence end face 42A, as illustrated in FIG. 11.

Transition of profile may occur within the above areas and also may stars at a boundary between the areas and the other area. Alternatively, transition may occur within around the boundary. Such manners of gradual profile transition prevents the emission face 2C from being locally disturbed.

The present embodiment enables illumination light propagating via any edge to have angularly diverged paths produced by reflections at arc-like slopes on the back face, not only in the vicinity of the incidence end face 42A but also around both lateral edges. Therefore, according to the mechanism described with referring to FIGS. 6 and 7, abnormal emission due to reflective appearance of edges is suppressed around the incidence end face 42A and both lateral edges.

(3) Modifications

None of the above first and second embodiments aim to limit the scope of the present invention. For instance, the following modifications are allowed.

(a) In the above embodiments, guide plates made of scattering-and-guiding material (scattering-and-guiding plates) are employed. However, a transparent guide plate may alternatively employed. Materials and methods of manufacturing of guide plates are not subject to particular limitation. Methods of controlling projection profile are also free from limitation. For example, mold itself may be processed so as to have cirque-like and V-shaped-valley-like configurations.

(b) In the above embodied surface light source devices of side light type and liquid crystal displays, arc-like-profiled projections and triangle-like-profiled projections are formed on major faces which function as back faces (opposite with emission faces). Alternatively, the major faces may be used as emission faces. In these cases, abnormal emission due to reflective appearance of edges is prevented from emerging in the vicinity of an incidence face and/or lateral edges.

(c) A guide plate with a cross section other than wedge-shaped may be employed. For instance, a guide plate having uniform thickness except projections.

(d) Two or more minor faces of a guide plate may provide incidence end faces, respectively. A plurality of primary light sources may be arranged accordingly.

(e) A primary light source provided with light source elements other than rod-like ones. For example, a plurality of point-like light source elements such as LEDs may be employed in a primary light source arrangement (f) A surface light source device of side light type in accordance with the present invention may be applied to uses other than backlighting of LCD panels. For instance, applications to arrangements for various illumination devices or display devices are broadly allowed.

What is claimed is:

1. A guide plate comprising:
   a minor face to provide an incidence end face for introducing light; and
   major faces to provide an emission face for emitting light which has been introduced through said incidence end face and to provide a back face which is opposite with said emission face, said major faces having a width extending across the incidence end face and a length extending from the incidence end face to an opposite end,
   wherein one of said emission face and said back face is provided with a great number of projections each of which extends approximately parallel to said length, substantially across said light guide plate,
   said projections include arc-like-profiled within a first predetermined range near to said incidence end face.

2. A guide plate according to claim 1, wherein said projections are configured so that projection profile transits gradually from an arc-like-shape to triangle-like shape according to distance from said incidence end face.

3. A guide plate according to claim 1 or 2, wherein said projections further include arc-like-profiled projections located within a second predetermined range along a flank face of said guide plate.

4. A guide plate according to claim 1 or 2, wherein said guide plate is provided with uniform scattering power inside.

5. A guide plate according to claim 3, wherein said guide plate is provided with uniform scattering power inside.

6. A surface light source device of side light type including a primary light source and a guide plate,
   said guide plate comprising:
   a minor face to provide an incidence end face for introducing light supplied from said primary light source; and
   major faces to provide an emission face for emitting light which has been introduced through said incidence end face and to provide a back which is opposite with said emission face, said major faces having a width extending across the incidence end face and a length extending from the incidence end face to an opposite end, wherein one of said emission face and said back face is provided with a great number of projections each of which extends approximately parallel to said length, substantially across said light guide plate, said projections are arc-like-profiled within a first predetermined range near to said incidence end face.

7. A surface light source device of side light type according to claim 6, wherein said projections are configured so that projection profile transits gradually from an arc-like-shape to a triangle-like shape according to distance from said incidence end face.

8. A surface light source device of side light type according to claim 6 or 7, wherein said projections further include arc-like-profiled projections located within a second predetermined range along a flank face of said guide plate.

9. A surface light source device of side light type according to claim 6 or 7, wherein said guide plate is provided with uniform scattering power inside.

10. A surface light source device of side light type according to claim 8, wherein said guide plate is provided with uniform scattering power inside.

11. A liquid crystal display including a liquid crystal display panel and a surface light source device of side light type for illumination said liquid crystal display panel, said surface light source device of side light type including a primary light source and a guide plate, said guide plate comprising:
    a minor face to provide an incidence end face for introducing light supplied from said primary light source; and
    major faces to provide an emission face for emitting light which has been introduced through said incidence end face and to provide a back face which is opposite with said emission face, said major faces having a width extending across the incidence end face and a length extending from the incidence end face to an opposite end,
    wherein one of said emission face and said back face is provided with a great number of projections each of which extends approximately parallel to said length, substantially across said light guide plate in a direction approximately vertical to said incidence end face, said projections are arc-like-profiled within a first predetermined range near to said incidence end face.

12. A liquid crystal display according to claim 11, wherein said projections are configured so that said projection profile transits gradually from an arc-like-shape to a triangle-like shape according to distance from said incidence end face.

13. A liquid crystal display according to claim 11 or 12, wherein said projections further include arc-like-profiled projections located within a second predetermined range along a flank face of said guide plate.

14. A liquid crystal display according to claim 11 or 12, wherein said guide plate is provided with uniform scattering power inside.

15. A liquid crystal display according to claim 13, wherein said guide plate is provided with uniform scattering power inside.

16. A guide plate according to claim 1, wherein the arc-like-profiled projections are repeated across said width.

17. A surface light source device of side light type according to claim 6, wherein the arc-like-profiled projections are repeated across said width.

18. A liquid crystal display according to claim 11, wherein the arc-like-profiled projections are repeated across said width.

19. A guide plate comprising:
    a minor face to provide an incidence end face for introducing light; and
    major faces to provide an emission face for emitting light which has been introduced through said incidence end face and to provide a back face which is opposite with said emission face, said major faces having a width extending across the incidence end face and a length extending from the incidence end face to an opposite end,
    wherein the back faces provided with a great number of projections, each of which extends approximately parallel to said length, substantially across said light guide plate,
    said projections are arc-like-profiled within a first predetermined range near to said incidence end face.

* * * * *